United States Patent
Nishikawa et al.

(10) Patent No.: US 6,685,998 B1
(45) Date of Patent: Feb. 3, 2004

(54) OPTICAL COMPENSATORY SHEET COMPRISING TRANSPARENT SUPPORT AND OPTICALLY ANISOTROPIC LAYER

(75) Inventors: Hideyuki Nishikawa, Minami-ashigara (JP); Ken Kawata, Minami-ashigara (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 273 days.

(21) Appl. No.: 09/670,579

(22) Filed: Sep. 27, 2000

(30) Foreign Application Priority Data

Sep. 27, 1999 (JP) .............................. 11-271955
Mar. 28, 2000 (JP) ......................... 2000-088158
Apr. 21, 2000 (JP) ......................... 2000-121008

(51) Int. Cl.[7] .............................................. C09K 19/00
(52) U.S. Cl. ........................... 428/1.3; 428/1.2; 428/1.1; 252/294.01; 252/299.68
(58) Field of Search ...................... 252/299.01, 299.1, 252/299.2, 299.3, 299.4, 299.5, 299.6, 299.61, 299.62, 299.63, 299.64, 299.65, 299.66, 299.67, 299.68, 299.7; 428/1.2, 1.3, 1.25, 1.26

(56) References Cited

U.S. PATENT DOCUMENTS

| | | | | |
|---|---|---|---|---|
| 5,380,459 A | * | 1/1995 | Kanemoto et al. | 252/299.01 |
| 5,583,679 A | * | 12/1996 | Ito et al. | 349/118 |
| 5,635,105 A | * | 6/1997 | Kawata et al. | 252/299.01 |
| 5,736,067 A | * | 4/1998 | Kawata et al. | 252/299.5 |
| 5,747,121 A | * | 5/1998 | Okazaki et al. | 428/1 |
| 5,805,253 A | * | 9/1998 | Mori et al. | 349/118 |
| 5,853,801 A | * | 12/1998 | Suga et al. | 427/164 |
| 6,139,771 A | * | 10/2000 | Walba et al. | 252/299.01 |

* cited by examiner

*Primary Examiner*—Mark F. Huff
*Assistant Examiner*—Jennifer R Sadula
(74) *Attorney, Agent, or Firm*—Burns, Doane, Swecker & Mathis, LLP

(57) ABSTRACT

An optical compensatory sheet comprises a transparent support and an optically anisotropic layer. The optically anisotropic layer is formed from liquid crystal molecules. Three principal refractive indices of the optically anisotropic layer are different from each other.

13 Claims, 1 Drawing Sheet

US 6,685,998 B1

OPTICAL COMPENSATORY SHEET COMPRISING TRANSPARENT SUPPORT AND OPTICALLY ANISOTROPIC LAYER

FIELD OF THE INVENTION

The present invention relates to an optical compensatory sheet which comprises a transparent support and an optically anisotropic layer formed from liquid crystal molecules.

BACKGROUND OF THE INVENTION

A liquid crystal display generally comprises a liquid crystal cell, a polarizing element and an optical compensatory sheet (phase retarder). In a display of transmission type, two polarizing elements are provided on both sides of the liquid crystal cell, and one or two optical compensatory sheets are placed between the liquid crystal cell and the polarizing element. A display of reflection type comprises a reflection plate, a liquid crystal cell, an optical compensatory sheet and a polarizing element in this order.

The liquid crystal cell comprises a pair of substrates, rod-like liquid crystal molecules and an electrode layer. The rod-like liquid crystal molecules are provided between the substrates. The electrode layer has a function of applying a voltage to the rod-like liquid crystal molecule. The liquid crystal cells can be classified into various display modes according to alignment of the rod-like liquid crystal molecules in the cell. Examples of the display modes for transmission type include TN (twisted nematic) mode, IPS (in-plane switching) mode, FLC (ferroelectric liquid crystal) mode, OCB (optically compensatory bend) mode, STN (super twisted nematic) mode and VA (vertically aligned) mode. Examples of the modes for reflection type include TN mode and HAN (hybrid aligned nematic) mode.

The optical compensatory sheet is widely used in various liquid crystal displays because it prevents the displayed image from undesirable coloring and enlarges a viewing angle of a liquid crystal cell. A stretched polymer film has been used as the optical compensatory sheet.

Japanese Patent Provisional Publication No. 2(1990)-264905 discloses a process for preparing an optical compensatory sheet. In the process, a polymer that forms, by stretching, a refractive anisotropic body showing positive birefringence is biaxially stretched. The thus-prepared optically biaxial polymer film is particularly effective in optically compensating a liquid crystal cell containing rod-like liquid crystal molecules oriented in homeotropic alignment (e.g., a cell of VA mode).

An optical compensatory-sheet can be formed from liquid crystal molecules in place of using the stretched polymer film. An optically anisotropic layer containing the liquid crystal molecules is provided on a transparent support. Since the liquid crystal molecules have various alignment forms, an optical compensatory sheet obtained by using the liquid crystal molecule has a specific optical characteristic that cannot be obtained by the conventional stretched polymer film.

Rod-like or discotic liquid crystal molecules are used in the optical compensatory sheet. A rod-like liquid crystal molecule is positively optically uniaxial. In detail, two principal refractive indices (indices along two directions perpendicular to the long axis of the rod-like molecule) are essentially identical, and the other principal refractive index (along the direction parallel to the long axis of the molecule) is larger than the two indices. In contrast, a discotic liquid crystal molecule is negatively optically uniaxial. In detail, two principal refractive indices (indices along two directions in a discotic plane of the molecule) are essentially the same, and the other principal refractive index (along the direction parallel to normal of the discotic plane) is smaller than the two indices.

SUMMARY OF THE INVENTION

An optically biaxial polymer film can be obtained according to the stretching process of Japanese Patent Provisional Publication No. 2(1990)-264905. When the stretched polymer film is used as an optical compensatory sheet for enlarging a viewing angle of a display, a slow axis of the stretched polymer film must be parallel to the transmitting axis of a polarizing membrane in the display. The film (usually in the form of a roll) must be stretched along the width to laminate the polarizing membrane and the stretched polymer film continuously. However, the slow axis in the plane is often made to have fan-shaped distribution when the film is continuous stretched along the width.

The problem of the stretched polymer film can be solved by using an optical compensatory sheet comprising an optically anisotropic layer formed from liquid crystal molecules on a transparent support. Liquid crystal molecules generally have various alignment forms. However, rod-like or discotic liquid crystal molecules are optically uniaxial in principle. Accordingly, it is technically difficult to obtain optical characteristics of the optically biaxial polymer film by using an optically anisotropic layer formed from rod-like or discotic liquid crystal molecules.

An object of the present invention is to form an optically biaxial optical compensatory sheet by using liquid crystal molecules.

Another object of the present invention is to provide an optical compensatory sheet suitable for a liquid crystal cell containing rod-like liquid crystal molecules oriented in homeotropic alignment.

A further object of the invention is to provide an optical compensatory sheet which can be continuously laminated on a polarizing membrane.

The present invention provides an optical compensatory sheet comprising a transparent support and an optically anisotropic layer formed from liquid crystal molecules, wherein three principal refractive indices of the optically anisotropic layer are different from each other.

The invention also provides a process for the preparation of an optical compensatory sheet, which comprises the steps in order of coating a transparent support with discotic liquid crystal molecules having a monovalent group as a substituent group of a discotic core, said monovalent group containing a benzene ring and a double bond conjugated with the benzene ring; aligning the discotic liquid crystal molecules at an average inclined angle of less than 5°; and exposing the layer to polarized light.

The invention further provides a process for the preparation of an optical compensatory sheet, comprising the steps in order of coating a transparent support with rod-like liquid crystal molecules having a benzene ring and a double bond conjugated with the benzene ring; orienting the rod-like liquid crystal molecules in cholesteric alignment at an average inclined angle of less than 5°; and exposing the layer to polarized light.

The term "essentially parallel" or "essentially perpendicular" in the present specification means that the angle between the noticed directions is within the range of 0°(180°)±10° or 90°±10°, respectively. The angle allowance is preferably less than ±8°, more preferably less than ±6°, further preferably less than ±4°, and most preferably less than ±2°.

The applicants have studied liquid crystals, and succeeded in preparing an optically biaxial optical compensatory sheet from liquid crystal molecules having different three principal refractive indices along three directions (the first embodiment of the invention). The optically anisotropic layer formed from the liquid crystal molecules having different three principal refractive indexes has optical characteristics equal to those of the optically biaxial polymer film.

The applicants have further studied liquid crystals, and succeeded in preparing an optically biaxial optical compensatory sheet having different three principal refractive indexes along three directions from optically uniaxial discotic liquid crystal molecules (the second embodiment of the invention). In preparation of the sheet, photosensitive functional groups (e.g., benzene ring and a monovalent group containing a double bond conjugated with the benzene ring) can be introduced into the discotic liquid crystal molecules. When the molecules are exposed to polarized light, photosensitive functional groups oriented along the direction of polarization are selectively subjected to a photochemical reaction. The photochemically reacted discotic liquid crystal molecules show a refractive index along the direction of polarization lower than the index of discotic liquid crystal molecules before the photochemical reaction. Therefore, an optically biaxial anisotropic layer can be formed by irradiating polarized light (e.g., ultraviolet ray) from a certain direction to an optically uniaxial anisotropic layer formed from the discotic liquid crystal molecules. The above-described simple process can form an optically biaxial anisotropic layer having optical characteristics equal to those of the optically biaxial polymer film.

The applicants have furthermore studied liquid crystals, and succeeded in preparing an optically biaxial optical compensatory sheet having different three principal refractive indexes along three directions from optically uniaxial rod-like liquid crystal molecules (the third embodiment of the invention). In preparation of the sheet, photosensitive functional groups (e.g., benzene ring and a monovalent group containing a double bond conjugated with the benzene ring) can be introduced into the rod-like liquid crystal molecules. When the molecules are exposed to polarized light, photosensitive functional groups oriented along the direction of polarization are selectively subjected to a photochemical reaction. The photochemically reacted rod-like liquid crystal molecules show a refractive index along the direction of polarization lower than the index of rod-like liquid crystal molecules before the photochemical reaction. Therefore, an optically biaxial anisotropic layer can be formed by irradiating polarized light (e.g., ultraviolet ray) from a certain direction to a negatively optically uniaxial anisotropic layer in which rod-like liquid crystal molecules are oriented in cholesteric alignment at an average inclined angle of less than 5°. The above-described simple process can form an optically biaxial anisotropic layer having optical characteristics equal to those of the optically biaxial polymer film.

The optically biaxial optical compensatory sheet can be used in various liquid crystal displays. For example, a liquid crystal cell containing rod-like liquid crystal molecules oriented in homeotropic alignment can be advantageously used in combination with an optical compensatory sheet in which a direction giving the smallest principal refractive index is essentially parallel to a normal of a transparent support.

Further, an optical compensatory sheet can be prepared with very high productivity. A rubbing treatment of an orientation layer can be easily conducted along a longitudinal direction of a rolled transparent support. If the slow axis in plane of an optically anisotropic layer is parallel to the width of the optical compensatory sheet in the form of a roll, the rolled optical compensatory sheet and a rolled polarizing membrane can be continuously laminated (so that the slow axis may be parallel to the transmitting axis of the polarizing membrane). In other words, the rubbing treatment of the orientation layer can be conducted along a longitudinal direction (i.e., along the easiest direction) to form the slow axis in the plane of the optically anisotropic layer along the width, whereby the optical compensatory sheet and the polarizing membrane can be easily laminated. Consequently, an optical compensatory sheet can be prepared with very high productivity by using optically biaxial liquid crystal molecules, which can form an optically anisotropic layer in which the slow axis in plane is essentially perpendicular to the rubbing direction of the orientation layer.

DETAILED DESCRIPTION OF THE INVENTION

Figure 1:
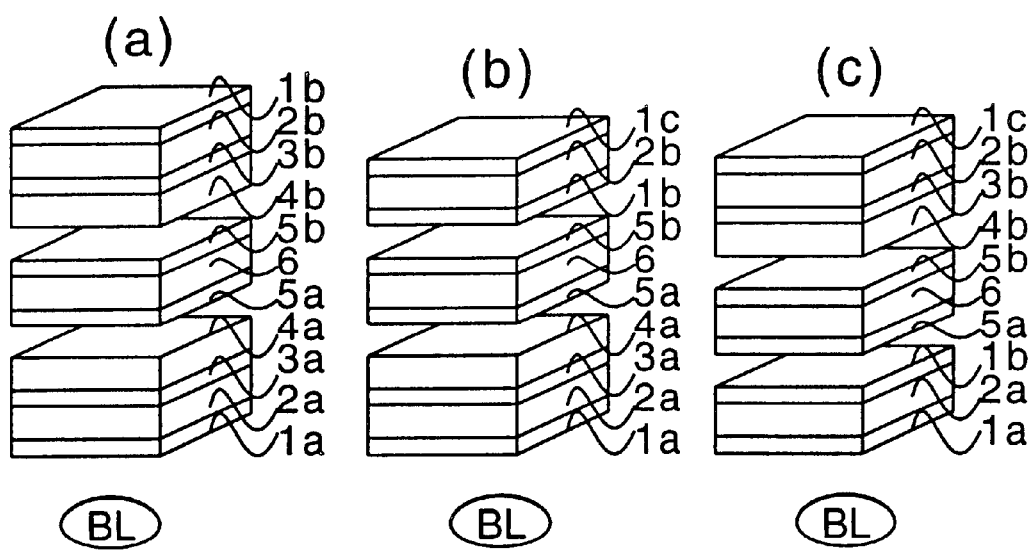
FIG. 1 schematically illustrates basic structures of liquid crystal displays of transmission type.

FIG. 1 schematically illustrates basic structures of liquid crystal displays of transmission type.

The display shown in FIG. 1(a) comprises a transparent protective film (1a), a polarizing membrane (2a), a transparent support (3a) of a lower optical compensatory sheet an optically anisotropic layer (4a) of the optical compensatory sheet, a lower substrate (5a) of a liquid crystal cell, rod-like liquid crystal molecules (6), an upper substrate (5b) of the liquid crystal cell, an optically anisotropic layer (4b) of an upper optical compensatory sheet, a transparent support (3b) of the optical compensatory sheet, a polarizing membrane (2b) and a transparent protective film (1b) in this order from the side of a back light (BL).

The display shown in FIG. 1(b) comprises a transparent protective film (1a), a polarizing membrane (2a), a transparent support (3a) of an optical compensatory sheet, an optically anisotropic layer (4a) of the optical compensatory sheet, a lower substrate (5a) of a liquid crystal cell, rod-like liquid crystal molecules (6), an upper substrate (5b) of the liquid crystal cell, a transparent protective film (1b), a polarizing membrane (2b) and a transparent protective film (1c) in this order from the side of a back light (BL).

The display shown in FIG. 1(c) comprises a transparent protective film (1a), a polarizing membrane (2b), a transparent protective film (1b), a lower substrate (5a) of a liquid crystal cell, rod-like liquid crystal molecules (6), an upper substrate (5b) of the liquid crystal cell, an optically anisotropic layer (4b) of an optical compensatory sheet, a transparent support (3b) of the optical compensatory sheet, a polarizing membrane (2b) and a transparent protective film (1c) in this order from the side of a back light (BL).

Figure 2:
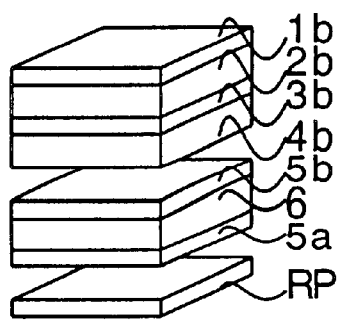
FIG. 2 schematically illustrates a basic structure of a liquid crystal display of reflection type.

FIG. 2 schematically illustrates a basic structure of a liquid crystal display of reflection type.

The display shown in FIG. 2 comprises a lower substrate (5a) of liquid crystal cell, rod-like liquid crystal molecules (6), an upper substrate (5b) of liquid crystal cell, an optically anisotropic layer (4b) of an optical compensatory sheet, a transparent support (3b) of the optical compensatory sheet, a polarizing membrane (2b) and a transparent protective film (1b) in this order from the side of a reflection plate (RP).

Transparent Support

The transparent support of the optical compensatory sheet preferably is a polymer film of a controlled optical anisotropy. The term "transparent" means that light transmittance is not less than 80%. With respect to the optical anisotropy of the support, a retardation in plane (Re) is preferably less than 100 nm, and more preferably less than 50 nm. A retardation along the thickness direction (Rth) is preferably less than 500 nm, and more preferably less than 300 nm. The Re and Rth retardation values are defined by the following formulas:

$$Re=(nx-ny) \times d$$

$$Rth=[\{(nx+ny)/2\}-nz] \times d$$

in which each of nx and ny is a refractive index in the plane; nz is a refractive index along the thickness direction; and d is the thickness of the transparent support.

Examples of the material for the transparent support include cellulose ester, polycarbonate, polysulfone, polyethersulfone, polyacrylate, polymethacrylate and norbornene resin. The optical anisotropy can be obtained by stretching the polymer film, or otherwise an optically anisotropic cellulose ester film can be prepared by incorporating a retardation increasing agent (described in European Patent No. 0,911,656 A2). The support of cellulose ester or synthetic polymer film is preferably formed by a solvent casting method.

The transparent support has a thickness preferably in the range of 20 to 500 µm, and more preferably in the range of 50 to 200 µm.

The transparent support can be subjected to a surface treatment (e.g., alkaline treatment, acid treatment, glow discharge treatment, corona discharge treatment, ultraviolet (UV) treatment, flame treatment) to improve adhesion to a layer formed on the support (e.g., adhesive layer, orientation layer, optically anisotropic layer). An adhesive layer (undercoating layer) can be also provided on the transparent support.

Orientation Layer

The orientation layer can be formed by rubbing treatment of an organic compound (preferably a polymer), oblique evaporation of an inorganic compound, formation of a micro groove layer, or stimulation of an organic compound (e.g., ω-tricosanoic acid, dioctadecylmethylammonium chloride, methyl stearate) according to a Langmuir-Blodgett method. Further, the aligning function of the orientation layer can be activated by applying an electric or magnetic field to the layer or irradiating the layer with light. The orientation layer is preferably formed by rubbing a polymer. The rubbing treatment can be conducted by rubbing a layer containing the aforementioned polymer with paper or cloth several times along a certain direction.

In the first embodiment of the invention, optically biaxial liquid crystal molecules are aligned with the orientation layer. According to the study of the applicants, some optically biaxial liquid crystal molecules (e.g., the compounds described in "Liquid Crystals", vol. 25 (1998), No. 2, page 149) are aligned so that the direction giving the largest refractive index may be essentially perpendicular to the slow axis in the plane of the orientation layer. In many conventional orientation layers, the slow axis in the plane is essentially parallel to the rubbing direction. If the optically biaxial liquid crystal molecules are homogeneously aligned to form an optically anisotropic layer, the direction giving the largest refractive index corresponds to the slow axis in the plane of the optically anisotropic layer. Therefore, if such optically biaxial liquid crystal molecules are used, the rubbing direction of the orientation layer is essentially perpendicular to the slow axis in the plane of the optically anisotropic layer. By thus arranging the rubbing direction to be essentially perpendicular to the slow axis, the aforementioned advantage can be obtained.

The polymer of the orientation layer is determined according to display mode. For the mode in which many rod-like liquid crystal molecules in the liquid crystal cell are essentially vertically aligned (i.e., for the mode such as VA, OCB or HAN), an orientation layer which can essentially horizontally align the liquid crystal molecules having negative optical anisotropy (i.e., an orientation layer which can arrange the direction giving the smallest refractive index to be essentially parallel to the normal of the transparent support) is used. In contrast, for the mode in which many rod-like liquid crystal molecules in the liquid crystal cell are essentially horizontally aligned (i.e., for the mode such as STN), an orientation layer which can essentially vertically align the liquid crystal molecules having negative optical anisotropy (i.e., an orientation layer which can arrange the direction giving the smallest refractive index to be essentially parallel to the plane of the transparent support) is used. Further, for the mode in which many rod-like liquid crystal molecules in the liquid crystal cell are essentially obliquely aligned (i.e., for the mode such as TN), an orientation layer which can essentially obliquely align the liquid crystal molecules having negative optical anisotropy (i.e., an orientation layer which can arrange the direction giving the smallest refractive index to be oblique to the plane of the transparent support) is used.

Polymers usable for the orientation layer are described in many known publications. The optically biaxial liquid crystal molecules used in the first embodiment of the invention can be aligned by an orientation layer of conventional polymer.

In the second embodiment of the invention, an orientation layer for aligning discotic liquid crystal molecules is used. The polymer of the orientation layer is determined according to the average inclined angle of the discotic liquid crystal molecules. Orientation layers for aligning the discotic liquid crystal molecules in an average inclined angle of less than 50 (essentially horizontally), not less than 500 (essentially vertically) or 56 to 500 (obliquely) are known. When the discotic liquid crystal molecules are essentially horizontally aligned, the direction giving the smallest refractive index is essentially parallel to the normal of the transparent support. In contrast, when the discotic liquid crystal molecules are essentially vertically aligned, the direction giving the smallest refractive index is essentially parallel to the plane of the transparent support. If the discotic liquid crystal molecules are obliquely aligned, the direction giving the smallest refractive index is oblique to the plane of the transparent support.

The polymer of the orientation layer is determined according to display mode. For the mode in which many rod-like liquid crystal molecules in the liquid crystal cell are essentially vertically aligned (i.e., for the mode such as VA, OCB or HAN), an orientation layer which can essentially horizontally align the discotic liquid crystal molecules is used. In contrast, for the mode in which many rod-like liquid crystal molecules in the liquid crystal cell are essentially horizontally aligned (i.e., for the mode such as STN), an orientation layer which can essentially vertically align the discotic liquid crystal molecules is used. Further, for the mode in which many rod-like liquid crystal molecules in the liquid crystal cell are essentially obliquely aligned (i.e., for the mode such as TN), an orientation layer which can obliquely align the discotic liquid crystal molecules is used.

In the third embodiment of the invention, an orientation layer for aligning rod-like liquid crystal molecules is used. The polymer of the orientation layer is determined according to the average inclined angle of the rod-like liquid crystal molecules. Orientation layers for aligning the rod-like liquid crystal molecules in an average inclined angle of less than 5° (essentially horizontally), not less than 50° (essentially vertically) or 5° to 50° (obliquely) are known. When the rod-like liquid crystal molecules are essentially horizontally oriented in cholesteric alignment, the direction giving the smallest refractive index is essentially parallel to the normal of the transparent support.

The polymer of the orientation layer is determined according to display mode. For the mode in which many rod-like liquid crystal molecules in the liquid crystal cell are essentially vertically aligned (i.e., for the mode such as VA, OCB or HAN), an orientation layer which can essentially horizontally align the rod-like liquid crystal molecules is used. In contrast, for the mode in which many rod-like liquid crystal molecules in the liquid crystal cell are essentially horizontally aligned (i.e., for the mode such as STN), an orientation layer which can essentially vertically align the rod-like liquid crystal molecules is used. Further, for the mode in which many rod-like liquid crystal molecules in the liquid crystal cell are essentially obliquely aligned (i.e., for the mode such as TN), an orientation layer which can obliquely align the rod-like liquid crystal molecules is used.

After the liquid crystal molecules are aligned with the orientation layer, the aligned liquid crystal molecules are fixed with the alignment maintained to form an optically anisotropic layer. The optically anisotropic layer can be transferred onto the transparent support. The aligned and fixed liquid crystal molecules can keep the alignment without the orientation layer.

An additive (such as a surface active agent) can be used in combination with the orientation layer to adjust the alignment of the liquid crystal molecules.

The orientation layer has a thickness of preferably 0.01 to 5 μm, more preferably 0.05 to 1 μm.

Optically Biaxial Optically Anisotropic Layer

In the, present invention, the optically anisotropic layer has such an optical anisotropy that three principal refractive indices along three directions are different from each other. The three directions of the optically anisotropic layer usually consists of the direction perpendicular to the layer plane and two directions in the plane, which are perpendicular to each other. The three principal refractive indexes n1, n2 and n3 (n1>n2>n3) preferably satisfy the following formula (I), and more preferably satisfy the following formula (II):

$n1-n2>0.005$ and $n2-n3>0.005$ (I)

$n1-n2>0.01$ and $n2-n3>0.01$ (II)

In the first embodiment of the invention, liquid crystal molecules are optically biaxial, which means that three principal refractive indices along three directions are different from each other. An optically biaxial optically anisotropic layer is formed by using the optically biaxial liquid crystal molecules.

The three principal refractive indexes n1, n2 and n3 (n1>n2>n3) of the optically biaxial liquid crystal molecules preferably satisfy the above-described formula (I), and more preferably satisfy the above-described formula (II).

An optically biaxial liquid crystal molecule has been proposed as an optically negative ferroelectric liquid crystal molecule used in a liquid crystal cell (which is described in Liquid Crystals vol. 25 (1998), No. 2, page 149). In the present invention, the liquid crystal molecule is used not in a liquid crystal cell but in an optically anisotropic layer since they are optical biaxial.

A polymerizable group can be introduced into the optically biaxial liquid crystal molecules to fix the alignment of the molecules. Examples of the polymerizable groups are the same as those for discotic liquid crystal molecules (Q1 to Q17 described after). The polymerizable group preferably is an unsaturated polymerizable group, an epoxy group or an aziridinyl group, more preferably is an unsaturated polymerizable group, and most preferably is an ethylenically unsaturated group.

In the second embodiment of the invention, an optically anisotropic layer is formed from discotic liquid crystal molecules.

The discotic liquid crystal molecule is described in various documents (C. Destrade et al, Mol. Crysr. Liq. Cryst., vol. 71, page 111 (1981); Japan Chemical Society, Quarterly Chemical Review (written in Japanese), chapter 5 and chapter 10, section 2 (1994); B. Kohne et al., Angew. Chem. Soc. Chem. Comm., page 1794 (1985); and J. Zhang et al., J. Am. Chem. Soc., vol. 116, page 2655 (1994)).

The discotic liquid crystal molecule preferably has a triphenylene nucleus as a discotic core, and preferably has a polymerizable group. The optically anisotropic layer is preferably formed by polymerization reaction of the polymerizable groups of the discotic liquid crystal molecules. Japanese Patent provisional Publication No. 8(1996)-27284 discloses the polymerization of discotic liquid crystal molecules.

Further, the discotic liquid crystal molecule preferably has a photosensitive functional group, which is reacted by light (K. Horie and H. Ushiki, Science of photofunctional Chemistry (written in Japanese), chapter 2 (1992), published by Kodan-sha). The photochemical reactions include a breaking reaction of σ-bond, a reaction of C=C double bond and a reaction of C=O double bond. Preferably, the reaction changes refractive index of the discotic liquid crystal molecules. A breaking reaction of σ-bond or a reaction of C=C double bond is preferred, and a reaction of C=C double bond is particularly preferred. Further, the C=C double bond is preferably conjugated with benzene ring. When a molecule having the double bond conjugated with benzene ring is exposed to light, the double bond forms a four-membered ring between two molecules to form a dimer. The refractive index of the discotic liquid crystal molecules is changed by forming the dimer.

The discotic liquid crystal molecule more preferably has a benzene ring and a monovalent group as a substituent group of a discotic core. The monovalent group contains a double bond conjugated with the benzene ring. The benzene ring and the double bond are preferably contained in a linking group between the discotic core and the polymerizable group.

The discotic liquid crystal molecule is preferably represented by the formula (I).

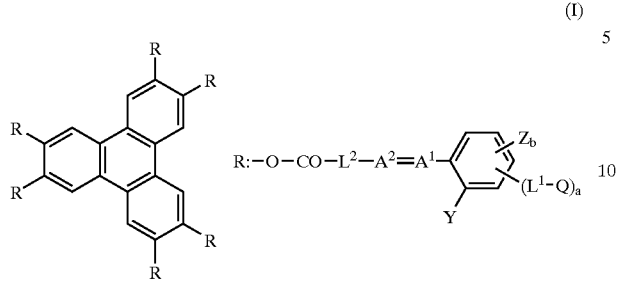

(I)

In the formula (I), $A^1$ is $CX^1$ or N. $CX^1$ is preferred to N. $X^1$ is hydrogen, a halogen atom, an alkyl group having 1 to 12 carbon atoms or an alkoxygroup having 1 to 12 carbon atoms. $X^1$ is preferably hydrogen or an alkyl group having 1 to 12 carbon atoms, more preferably hydrogen or an alkyl group having 1 to 6 carbon atoms, further preferably hydrogen or an alkyl group having 1 to 3 carbon atoms, and most preferably hydrogen.

In the formula (I), $A^2$ is $CX^2$ or N. $CX^2$ is preferred to N. $X^2$ is hydrogen, a halogen atom, an alkyl group having 1 to 12 carbon atoms or an alkoxy group having 1 to 12 carbon atoms, or $X^2$ is combined with Y to form a five- or six-membered ring. $X^2$ is preferably hydrogen or an alkyl group having 1 to 12 carbon atoms, more preferably hydrogen or an alkyl group having 1 to 6 carbon atoms, further preferably hydrogen or an alkyl group having 1 to 3 carbon atoms, and most preferably hydrogen.

The ring formed by combining $X^2$ with Y preferably is a hydrocarbon ring rather than a heterocyclic ring, and more preferably is an aliphatic ring rather than an aromatic ring. The ring is preferably a six-membered ring rather than a five-membered ring.

In the formula (I), Y is hydrogen, a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms, or Y is combined with $X^2$ to form a five-membered or six-membered ring. Y is preferably hydrogen or an alkyl group having 1 to 12 carbon atoms, more preferably hydrogen or an alkyl group having 1 to 6 carbon atoms, further preferably hydrogen or an alkyl group having 1 to 3 carbon atoms, and most preferably hydrogen.

In the formula (I), Z is a halogen atom, an alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms. Z is preferably an alkyl group having 1 to 12 carbon atoms, more preferably an alkyl group having 1 to 6 carbon atoms, further preferably an alkyl group having 1 to 3 carbon atoms.

In the formula (I), $L^1$ is a divalent linking group selected from the group consisting of —O—, —CO—, —S—, —NH—, an alkylene group, an alkenylene group, an alkynylene group, an arylene group and a combination thereof.

Examples of the combined divalent linking groups are shown below. In the examples, the left side is attached to benzene ring, and the right side is attached to the polymerizable group (Q). The AL means an alkylene group, an alkenylene group or an alkynylene group. The AR means an arylene group.

L1: —AL—CO—O—AL—
L2: —AL—CO—O—AL—O—
L3: —AL—CO—O—AL—O—AL—
L4: —AL—CO—O—AL—O—CO—
L5: —CO—AR—O—AL—
L6: —CO—AR—O—AL—O—
L7: —CO—AR—O—AL—O—CO—
L8: —CO—NH—AL—
L9: —NH—AL—O—
L10: —NH—AL—O—CO—
L11: —O—AL—
L12: —O—AL—O—
L13: —O—AL—O—CO—
L14: —O—AL—O—CO—NH—AL—
L15: —O—AL—S—AL—
L16: —O—CO—AL—AR—O—AL—O—CO—
L17: —O—CO—AR—O—AL—CO—
L18: —O—CO—AR—O—AL—O—CO—
L19: —O—CO—AR—O—AL—O—AL—O—CO—
L20: —O—CO—AR—O—AL—O—AL—O—AL—O—CO—
L21: —S—AL—
L22: —S—AL—O—
L23: —S—AL—O—CO—
L24: —S—AL—S—AL—
L25: —S—AR—AL—

In the formula (I), $L^2$ is a single bond or 1,4-phenylene. $L^2$ is preferably a single bond rather than 1,4-phenylene.

In the formula (I), Q is a polymerizable group, which is determined according to a polymerization reaction. Examples of the polymerizable groups (Q) are shown below.

—CH=CH$_2$ (Q1)

—CH=CH—CH$_3$ (Q2)

—CH=CH—C$_2$H$_5$ (Q3)

—CH=CH—n-C$_3$H$_7$ (Q4)

—C(CH$_3$)=CH$_2$ (Q5)

—CH=C(CH$_3$)—CH$_3$ (Q6)

—C≡CH (Q7)

—CH—CH$_2$ (epoxide) (Q8)

—CH—CH$_2$ (aziridine, NH) (Q9)

—SH (Q10)

—CHO (Q11)

—OH (Q12)

—CO$_2$H (Q13)

—N=C=O (Q14)

-continued

 (Q15)

 (Q16)

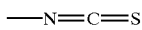 (Q17)

The polymerizable group (Q) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula (I), a is 1, 2, 3 or 4, preferably 1, 2 or 3, more preferably 1 or 2, and most preferably 1. If a is 1, the group of —$L^1$—Q is preferably attached to 4-position of the benzene ring.

In the formula (I), b is 0, 1, 2 or 3, preferably 0, 1 or 2, more preferably 0 or 1, and most preferably 0.

In the formula (I), a+b is 1, 2, 3 or 4.

In the formula (I), six groups represented by R are preferably identical though the groups can be different from each other.

Examples of the discotic liquid crystal molecules represented by the formula (I) are shown below by indicating the group represented by R.

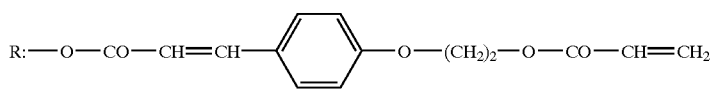
(I-1)

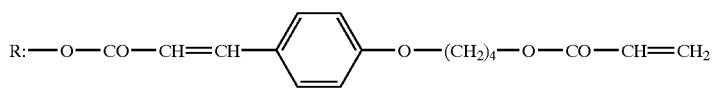
(I-2)

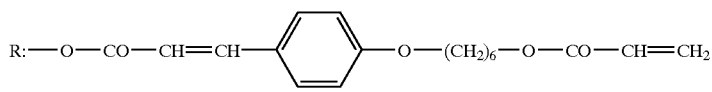
(I-3)

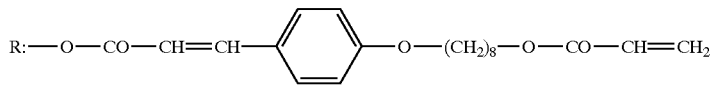
(I-4)

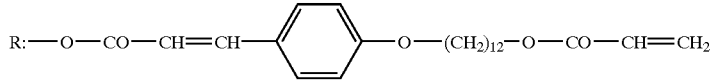
(I-5)

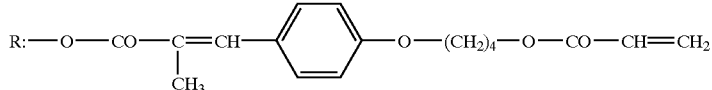
(I-6)

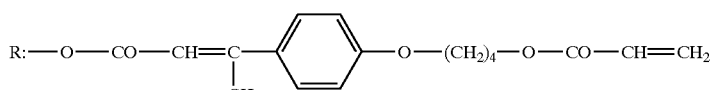
(I-7)

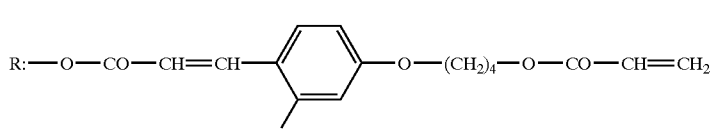
(I-8)

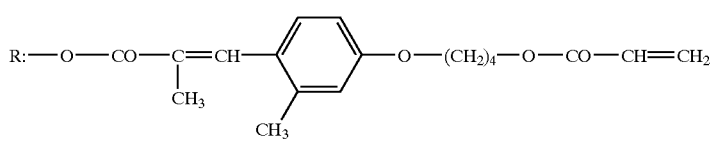
(I-9)

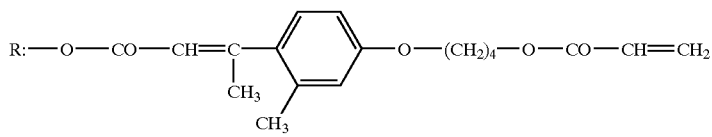
(I-10)

-continued
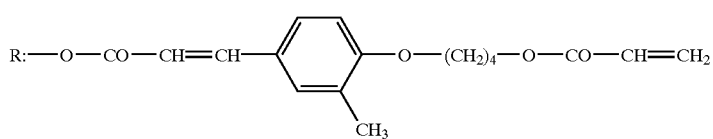
(I-11)
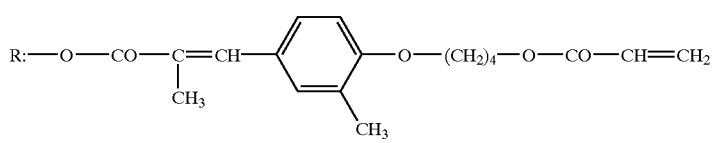
(I-12)
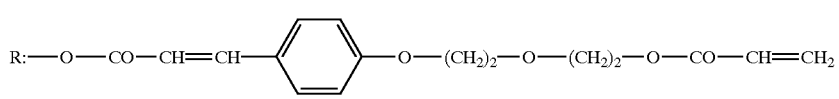
(I-13)
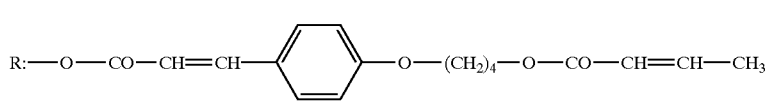
(I-14)
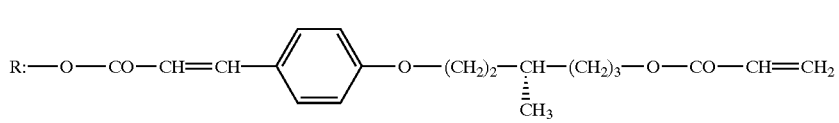
(I-15)
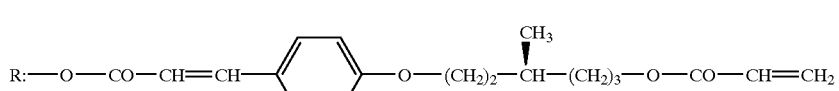
(I-16)
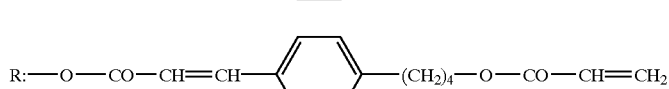
(I-17)
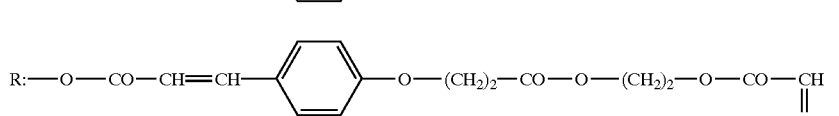
(I-18)
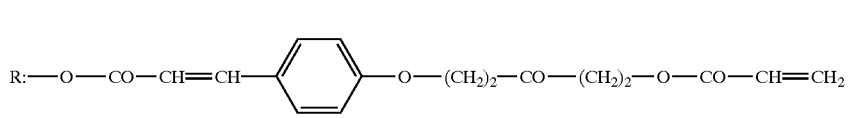
(I-19)
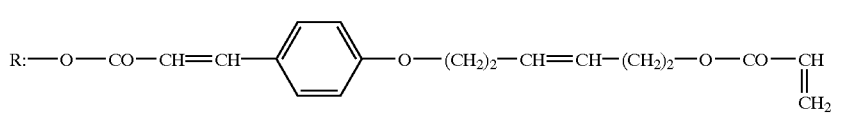
(I-20)
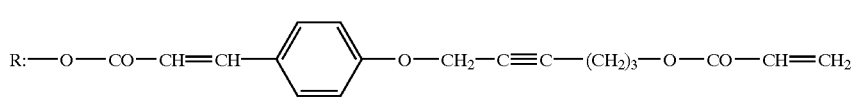
(I-21)
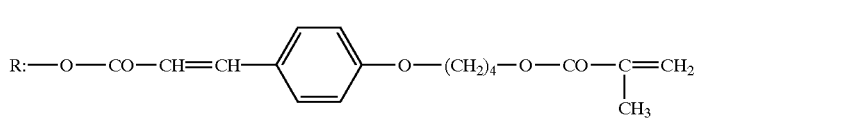
(I-22)
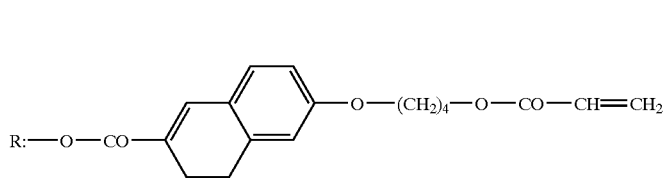
(I-23)

-continued

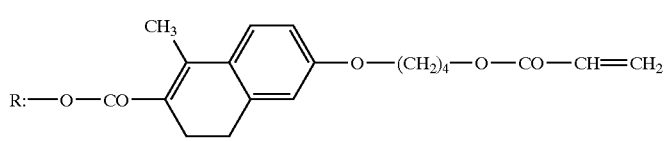
(I-24)

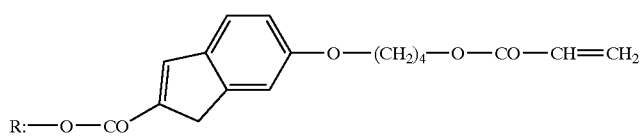
(I-25)

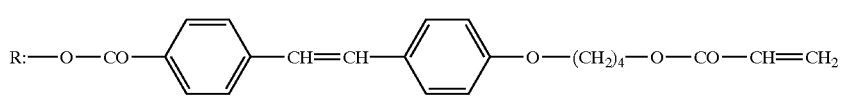
(I-26)

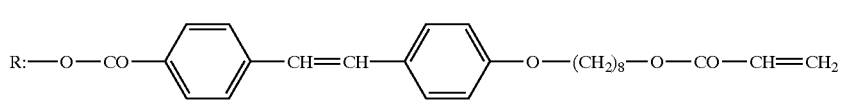
(I-27)

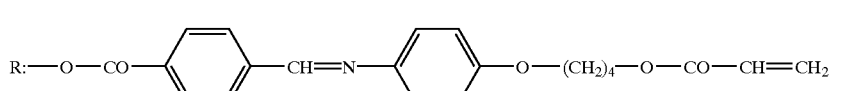
(I-28)

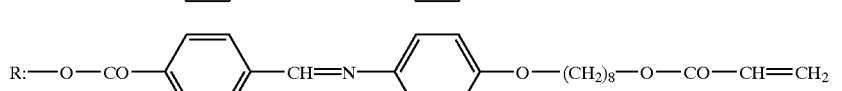
(I-29)

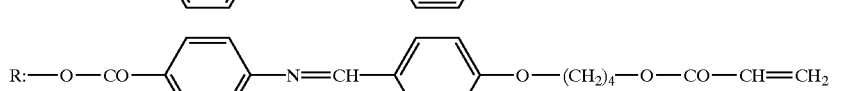
(I-30)

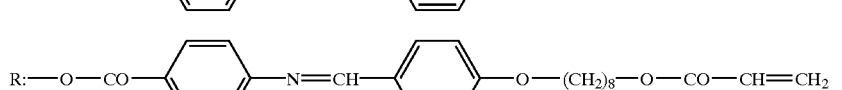
(I-31)

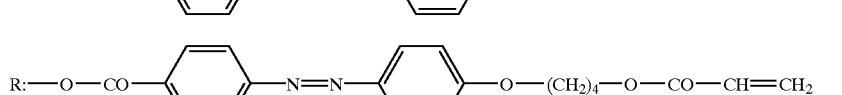
(I-32)

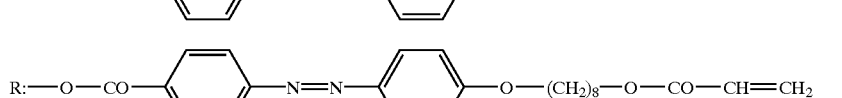
(I-33)

After the discotic liquid crystal molecules are aligned (preferably at an average inclined angle of less than 5°), they are preferably exposed to polarized light. The light is preferably linearly polarized. There is no particular restriction on the radiating direction and the polarizing direction. The polarized light is preferably ultraviolet light in the wavelength region of 200 to 400 nm.

Preferably, the refractive index in the plane of the optically anisotropic layer essentially changes during the step of exposing to polarized light. When the discotic liquid crystal molecules are aligned in an average inclined angle of less than 5°, the refractive index along the direction essentially parallel to the normal of the transparent support is the smallest of the three and the other two refractive indexes (along the directions in the plane of the support) are the same. By exposure to polarized light, the two refractive indices in the plane are changed into different values. Consequently, the optically biaxial optically anisotropic layer having different principal refractive indices along three directions is obtained.

The inclined angle of the discotic liquid crystal molecule means an angle between the plane of the discotic core and the plane surface of the transparent support.

Ultraviolet polarized light can polymerize the discotic liquid crystal molecules, and hence optical biaxiality and the polymerization of the discotic liquid crystal molecules can be given at the same time by polarized ultraviolet light. However, preferably the discotic liquid crystal molecules are beforehand polymerized by non-polarized ultraviolet light, and then made to be optically biaxial by polarized ultraviolet light. Accordingly, the step of exposing the discotic liquid crystal molecules to non-polarized ultraviolet light to polymerize the molecules is preferably performed between the step of aligning the discotic liquid crystal molecules in an average inclined angle of less than 5° and the step of exposing to polarized light.

In the third embodiment of the invention, an optically anisotropic layer is formed from rod-like liquid crystal molecules.

Preferred examples of the rod-like liquid crystal molecules include azomethines, azoxy molecules, cyanobiphenyls, cyanophenyl esters, benzoic esters, phenyl cyclohexanecarbonate esters, cycnophenylcyclohexanes, cyano-substituted phenylpyrimidines, alkoxy-substituted phenylpyrimidines, phenyldioxanes, tolans and alkenylcyclohexylbenzonitriles. Further, some metal complexes can be used as the rod-like liquid crystal molecules. Liquid crystal polymers having rod-like liquid crystal molecules in the repeating unit are also usable. In other words, the rod-like liquid crystal molecules may combine with (liquid crystal) polymers.

Descriptions of the rod-like liquid crystal molecules are found in "Kagaku-Sosetsu, Ekisho no Kageku" (written in Japanese), vol.22(1994), Chapters 4, 7 and 11; and "Ekisho Devise Handbook" (written in Japanese), chapter 3.

The birefringent refractive index of the rod-like liquid crystal molecules is preferably in the range of 0.001 to 0.7.

The rod-like liquid crystal molecules preferably have polymerizable groups described after.

Further, the rod-like liquid crystal molecule preferably has a photosensitive functional group, which is reacted by light (K. Horie and H. Ushiki, "Science of photofunctional Chemistry (written in Japanese)", chapter 2 (1992), published by Kodan-sha). The reaction includes breaking reaction of σ-bond, reaction of C=C double bond and reaction of C=O double bond. Preferably, the reaction changes refractive index of the rod-like liquid crystal molecules. In view of this, breaking reaction of σ-bond and reaction of C=C double bond are preferred, and reaction of C=C double bond is particularly preferred. Further preferably, the C=C double bond conjugates with benzene ring. If so, when the molecules are exposed to light, the double bond forms a four-membered ring between two molecules to form a dimer, and thereby the refractive index of the rod-like liquid crystal molecules is changed.

Particularly preferably, the rod-like liquid crystal molecule has a benzene ring and a monovalent group containing a double bond which conjugates with the benzene ring.

The rod-like liquid crystal molecule is preferably represented by the following formula (II).

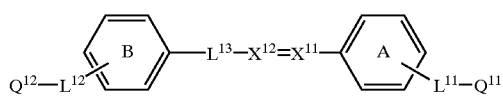
(II)

In the formula (II), $X^{11}$ is $CR^{11}$ or N. $CR^{11}$ is preferred to N. $R^{11}$ is hydrogen, a halogen atom, an alkyl group having 1 to 12 carbon atoms or an alkoxy group having 1 to 12 carbon atoms. $R^{11}$ is preferably hydrogen or an alkyl group having 1 to 12 carbon atoms, more preferably hydrogen or an alkyl group having 1 to 6 carbon atoms, further preferably hydrogen or an alkyl group having 1 to 3 carbon atoms, and most preferably hydrogen.

In the formula (II), $X^{12}$ is $CR^{12}$ or N. $CR^{12}$ is preferred to N. $R^{12}$ is hydrogen, a halogen atom, an alkyl group having 1 to 12 carbon atoms or an alkoxy group having 1 to 12 carbon atoms. $R^{12}$ is preferably hydrogen or an alkyl group having 1 to 12 carbon atoms, more preferably hydrogen or an alkyl group having 1 to 6 carbon atoms, further preferably hydrogen or an alkyl group having 1 to 3 carbon atoms, and most preferably hydrogen.

In the formula (II), each of $L^{11}$ and $L^{12}$ is independently a single bond or a divalent linking group selected from the group consisting of —O—, —CO—, —S—, —NH—, an alkylene group, an alkenylene group, an alkynylene group, an arylene group and a combination thereof.

Examples of the combined divalent linking groups are shown below. In the examples, the left side is attached to benzene ring, and the right side is attached to the polymerizable group. The AL means an alkylene group, an alkenylene group or an alkynylene group. The AR means an arylene group. The alkylene group, the alkenylene group, the alkynylene group and the arylene group may have substituent groups. Examples of the substituent groups include a halogen atom, an alkyl group having 1 to 12 carbon atoms, a halogen-substituted alkyl group having 1 to 12 carbon atoms, an alkoxy group having 1 to 12 carbon atoms, an acyl group having 2 to 13 carbon atoms, an alkylamino group having 1 to 12 carbon atoms and an acyloxy group having 2 to 13 carbon atoms.

L1: —O—AL—O—CO—

L2: —O—CO—

L3: —O—CO—AL—AR—O—AL—O—CO—

L4: —O—AL—O—AL—O—CO—

L5: —O—CO—AL—AR—O—AL—O—AL—O—CO—

L6: —NH—CO—AL—AR—O—AL—O—CO—

L7: —O—CO—AL—O—CO—

L8: —CO—AR—O—AL—O—

In the formula (II), $L^{13}$ is a single bond, —O—CO— or —NH—CO—, preferably a single bond or —O—CO—, and more preferably a single bond.

In the formula (II), each of $Q^{11}$ and $Q^{12}$ is independently a polymerizable group, which is determined according to polymerization reaction. Examples of the polymerizable groups are the same as those shown above (Q1 to Q17) for the discotic liquid crystal molecules.

Each of the polymerizable groups ($Q^{11}$ and $Q^{12}$) preferably is an unsaturated polymerizable group (Q1 to Q7), an epoxy group (Q8) or an aziridinyl group (Q9), more preferably is an unsaturated polymerizable group, and most preferably is an ethylenically unsaturated group (Q1 to Q6).

In the formula (II), each of the benzene rings A and B may have, as a substituent group, a halogen atom, an alkyl group having 1 to 12 carbon atoms, a halogen-substituted alkyl group having 1 to 12 carbon atoms, an alkoxy group having 1 to 12 carbon atoms, an acyl group having 2 to 13 carbon atoms, an alkylamino group having 1 to 12 carbon atoms or an acyloxy group having 2 to 13 carbon atoms.

The main chain connecting the polymerizable group ($Q^{11}$ or $Q^{12}$) is preferably attached to the para-position of the benzene ring A or B, respectively.

Examples of the rod-like liquid crystal molecules are shown below.

(II-1)
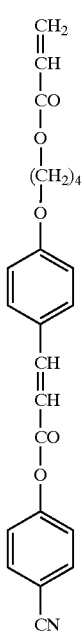
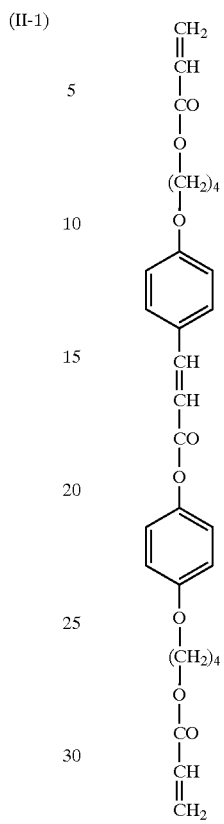
(II-2)
(II-3)
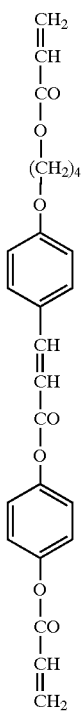
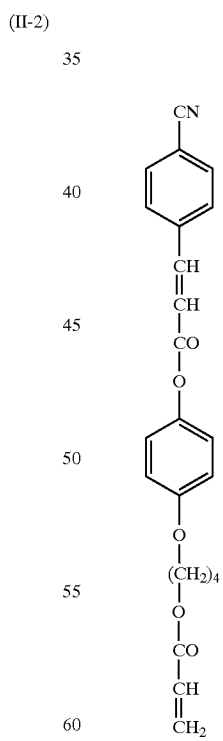
(II-4)

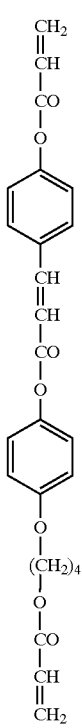
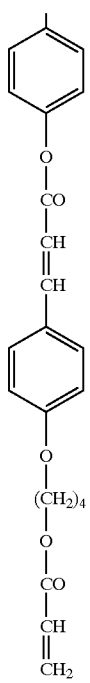
(II-5)
(II-6)
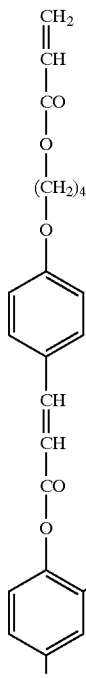
(II-7)

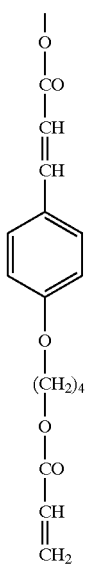
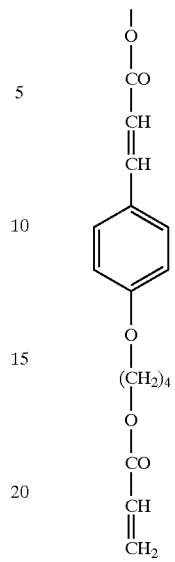
(II-8)
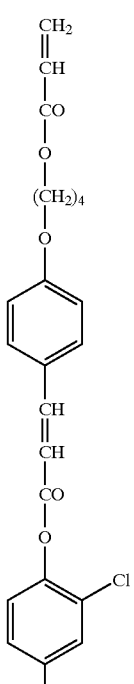
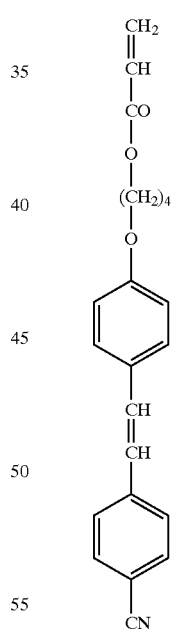
(II-9)

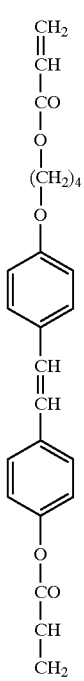
(II-10)
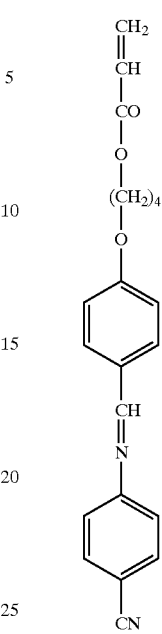
(II-12)
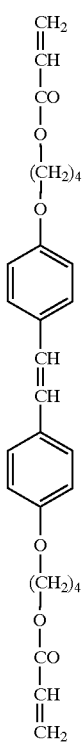
(II-11)
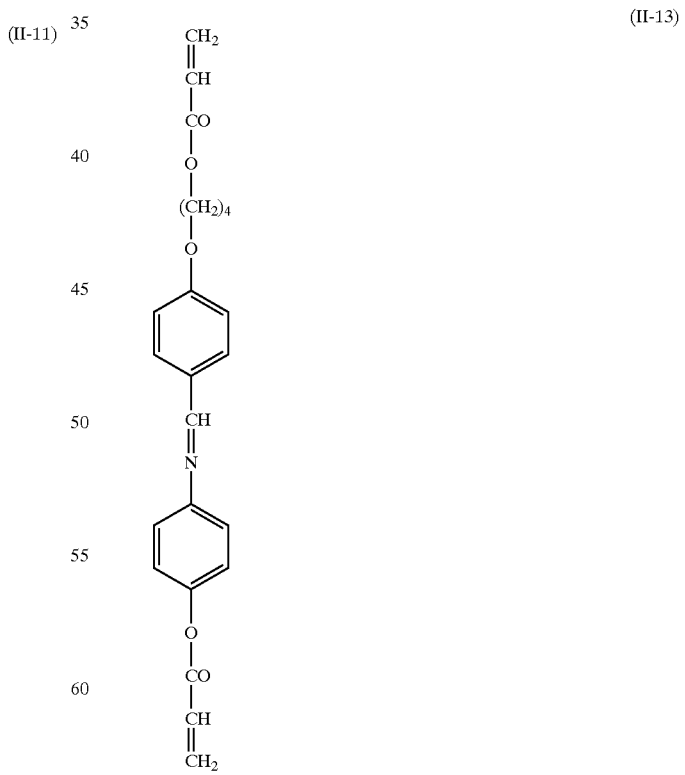
(II-13)

(II-14)
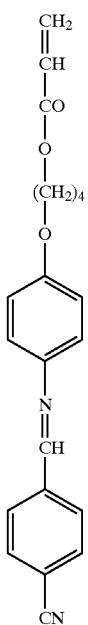
(II-16)
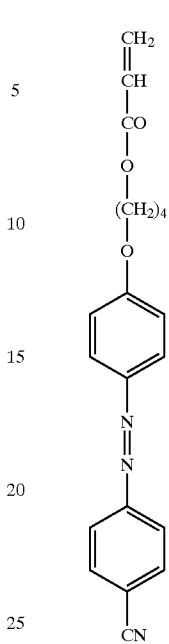
(II-15)
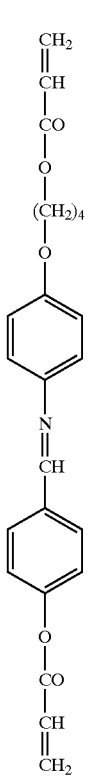
(II-17)
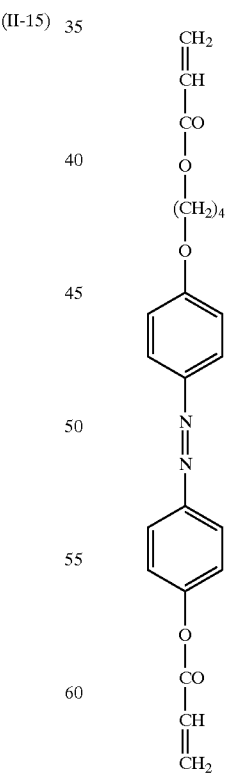

(II-18)
(II-19)
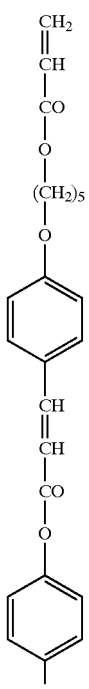
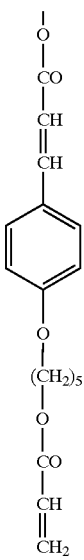
(II-20)
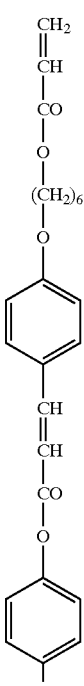

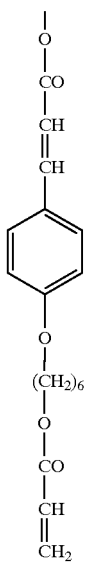
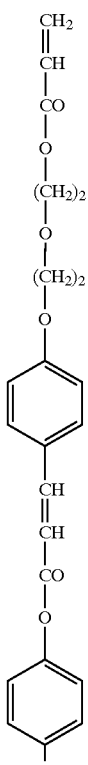
(II-21)
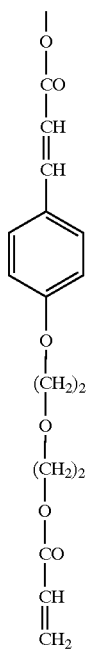
(II-22)
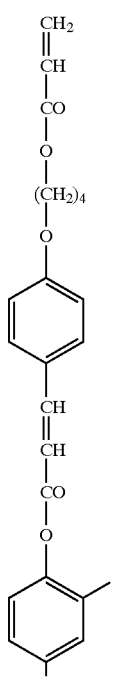

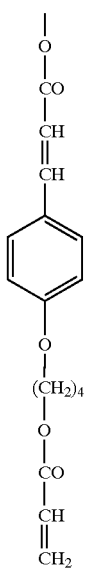
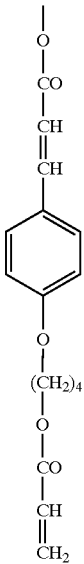
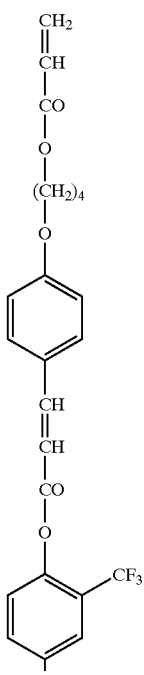
(II-23)
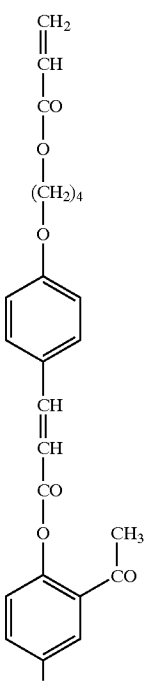
(II-24)

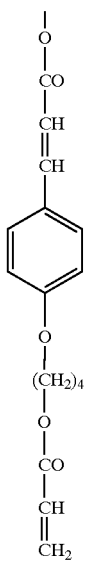
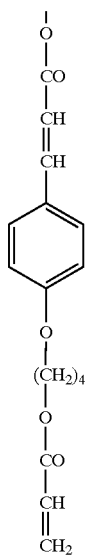
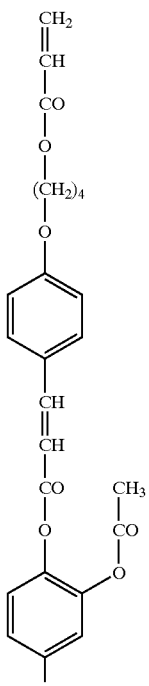
(II-25)
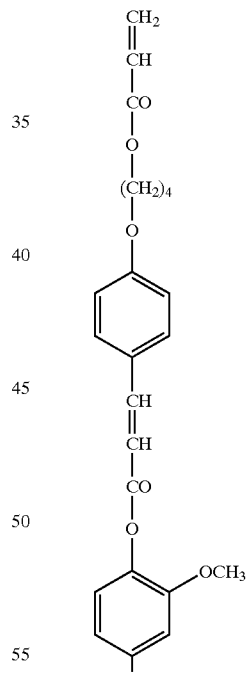
(II-26)

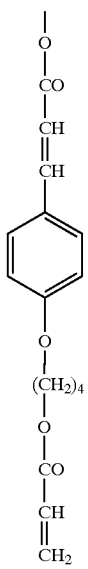
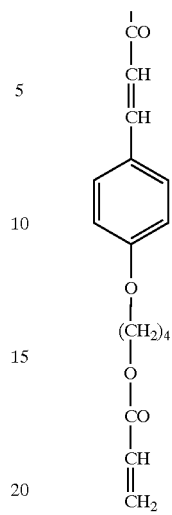
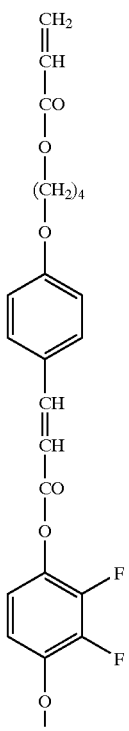
(II-27)
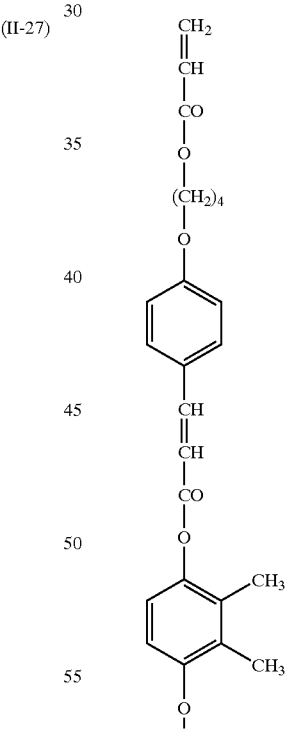
(II-28)

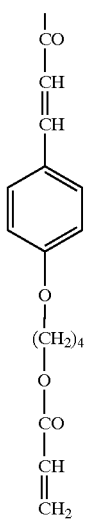
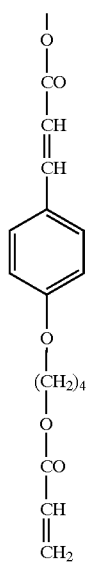
(II-29)
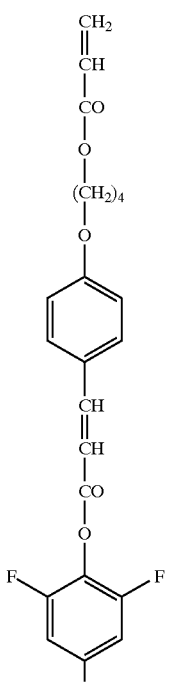
(II-30)
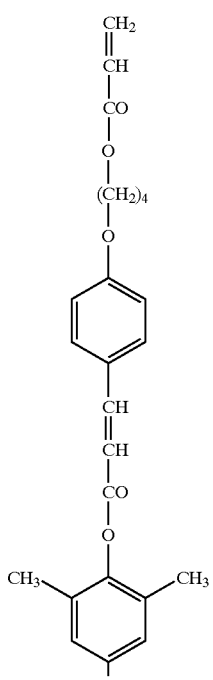

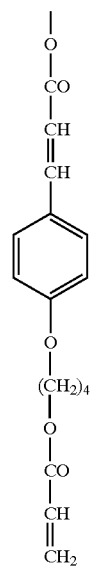
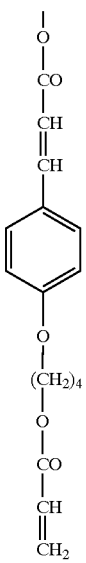
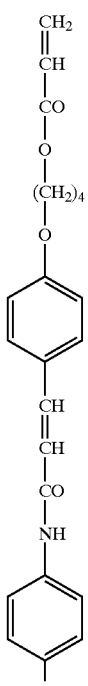
(II-31)
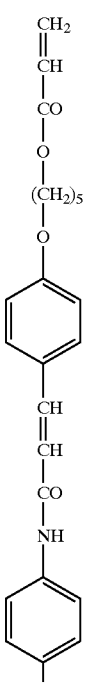
(II-32)

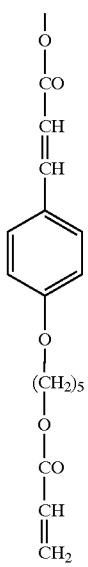
(II-33)
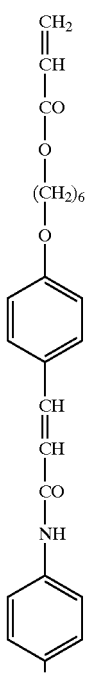
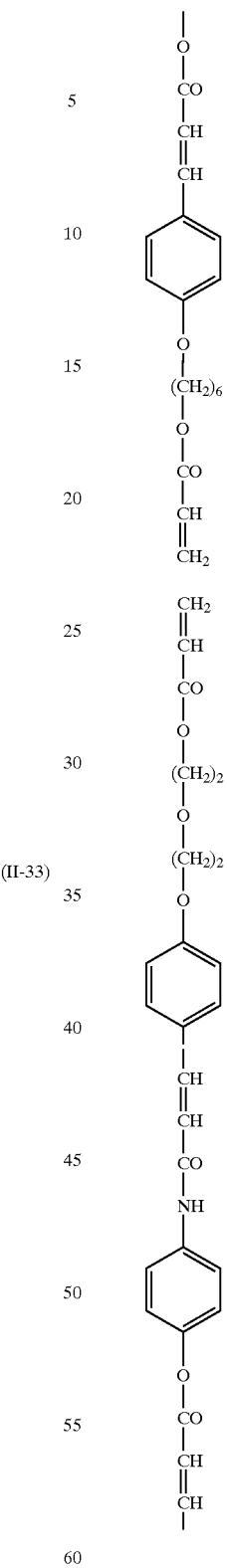
(II-34)

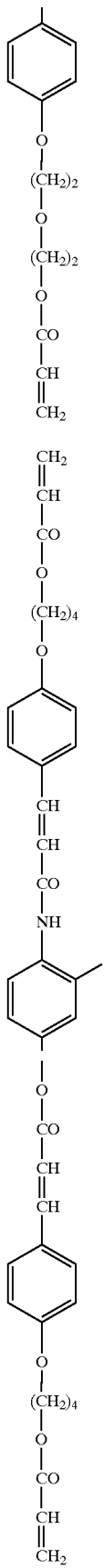
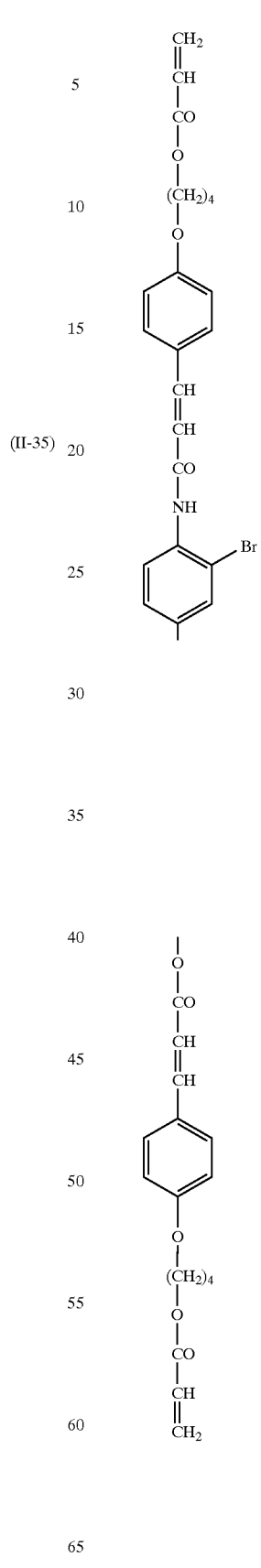
(II-35)
(II-36)

(II-37)
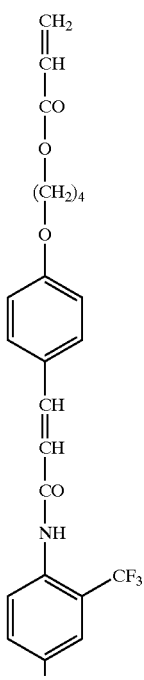
(II-38)
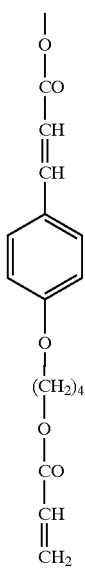

(II-39)
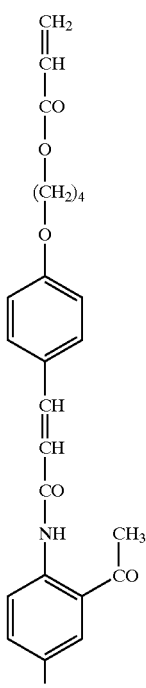
(II-40)
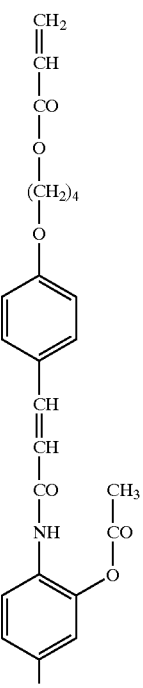
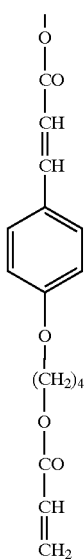
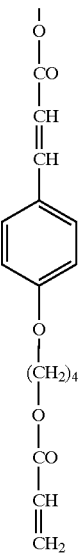

(II-41)
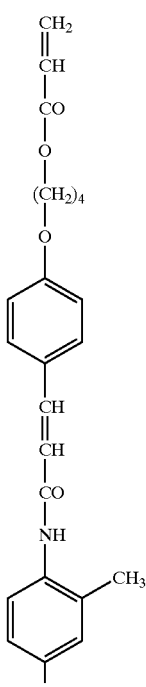
(II-42)
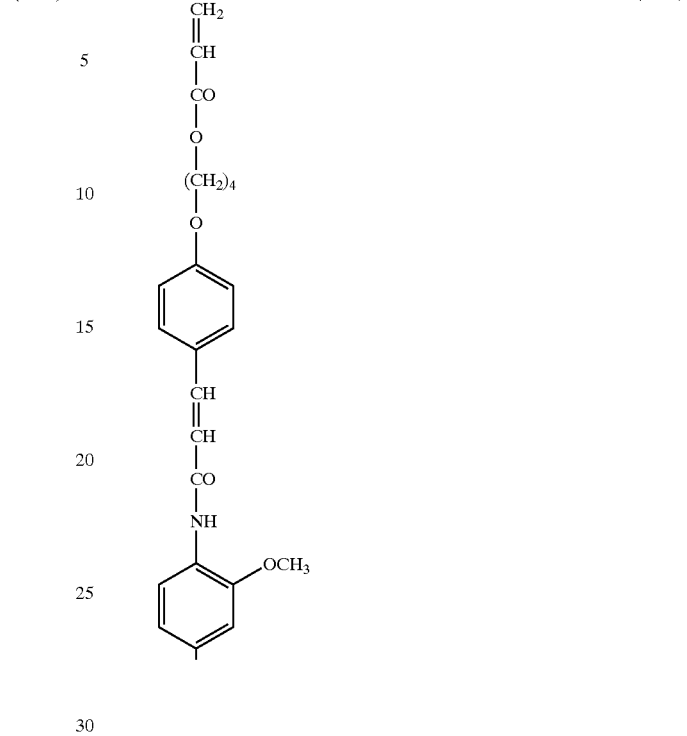
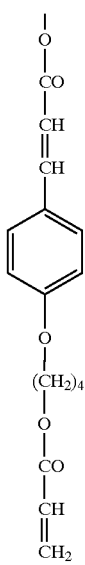

(II-43)
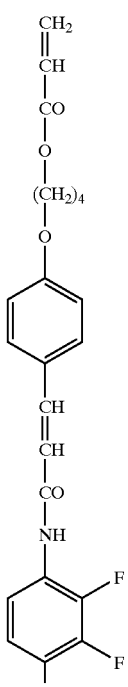
(II-44)
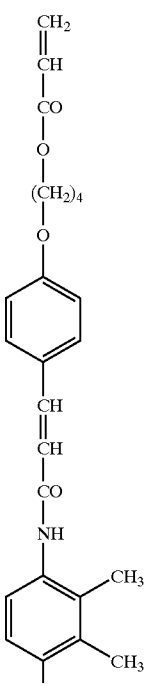
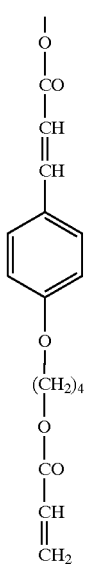
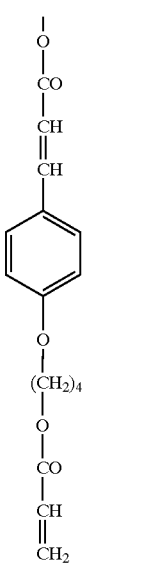

(II-45)
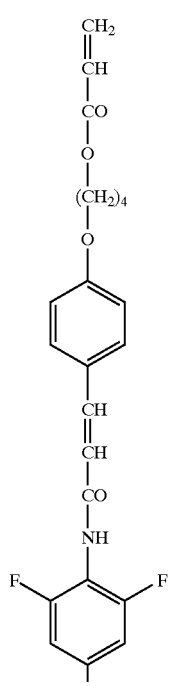
(II-46)
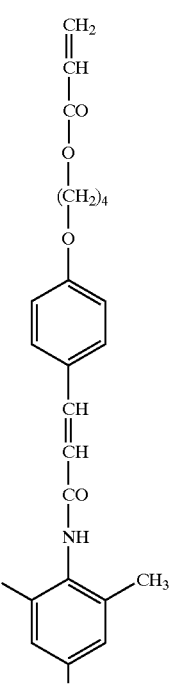
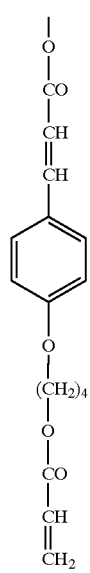
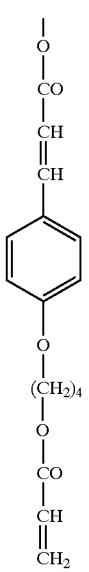

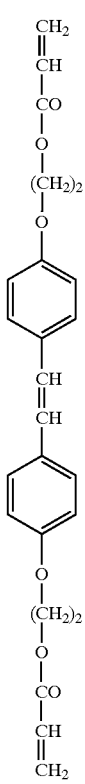 (II-47)
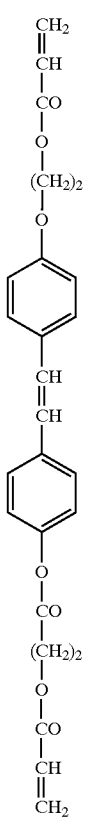 (II-48)
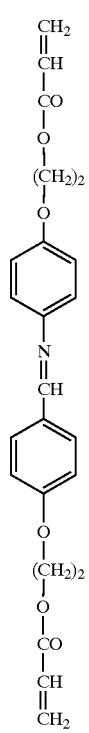 (II-49)
 (II-50)

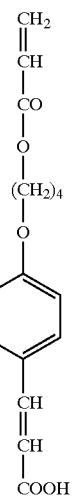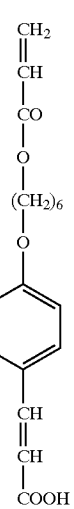

(II-51)

(II-52)

(II-53)

(II-54)

The rod-like liquid crystal molecules with a chiral agent can be oriented in cholesteric alignment. Known chiral agents (optical active compounds) can be used for the cholesteric liquid crystal molecules. The rod-like liquid crystal molecules can be also oriented in cholesteric alignment by introducing an asymmetric carbon into the molecules in place of using a chiral agent. The asymmetric carbon is introduced into AL in the above-described linking group. The optical activity may be either S or R.

After the rod-like liquid crystal molecules are aligned in an average inclined angle of less than 5°, they are preferably exposed to polarized light. The light is preferably linearly polarized. There is no particular restriction on the radiating direction and the polarizing direction. The polarized light is preferably ultraviolet light in the wavelength region of 200 to 400 nm.

The inclined angle of the rod-like liquid crystal molecule means an angle between the longitudinal direction of the molecule and the plane surface of the transparent support.

Preferably, the refractive index in the plane of the optically anisotropic layer essentially changes during the step of exposing to polarized light. When the rod-like liquid crystal molecules are oriented in cholesteric alignment (at random in the plane) with an average inclined angle of less than 5°, the refractive index along the direction essentially parallel to the normal of the transparent support is the smallest of the three and the other two refractive indexes (along the directions in the plane of the support) are the same. Thus, an optically uniaxial optically anisotropic layer is formed. By exposure to polarized light, the two refractive indexes in the plane are changed into different values. Consequently, the optically biaxial optically anisotropic layer having different principal refractive indexes along three directions is obtained.

Ultraviolet polarized light can polymerize the rod-like liquid crystal molecules, and hence optical biaxiality and the polymerization of the rod-like liquid crystal molecules can be given at the same time by polarized ultraviolet light. However, preferably the rod-like liquid crystal molecules are beforehand polymerized by non-polarized ultraviolet light, and then made to be optically biaxial by polarized ultraviolet light. Accordingly, the step of exposing the rod-like liquid crystal molecules to non-polarized ultraviolet light to polymerize the molecules is preferably performed between the step of orienting the rod-like liquid crystal molecules in cholesteric alignment with an average inclined angle of less than 5° and the step of exposing to polarized light.

The optically anisotropic layer is formed by coating an orientation layer with a liquid crystal composition (coating liquid) comprising the liquid crystal molecules and other optional additives (e.g., polymerization initiator, plasticizer, monomer, surface active agent, aligning temperature lowering agent, chiral agent).

Organic solvents for the liquid crystal composition are preferably used for preparing the liquid crystal composition. Examples of the organic solvents include an amide (e.g., N,N-dimethylformamide), a sulfoxide (e.g., dimethylsulfoxide), a heterocyclic compound (e.g., pyridine), a hydrocarbon (e.g., benzene, hexane), an alkyl halide (e.g., chloroform, dichloromethane), an ester (e.g., methyl acetate, butyl acetate), a ketone (e.g., acetone, methyl ethyl ketone) and an ether (e.g., tetrahydrofuran, 1,2-dimethoxyethane). Alkyl halide and ketone are preferred. Two or more organic solvents can be used in combination.

The composition can be coated according to a conventional coating method (e.g., wire bar coating method, extrusion coating method, direct gravure coating method, reverse gravure coating method, die coating method).

The polymerization reaction can be classified into a thermal reaction using a thermal polymerization initiator and a photo reaction using a photo polymerization initiator. A photo polymerization reaction is preferred.

Examples of the photo polymerization initiators include α-carbonyl compounds (described in U.S. Pat. Nos. 2,367,661, 2,367,670), acyloin ethers (described in U.S. Pat. No. 2,448,828), α-hydrocarbon substituted acyloin compounds (described in U.S. Pat. No. 2,722,512), polycyclic quinone compounds (described in U.S. Pat. Nos. 2,951,758, 3,046,127), combinations of triarylimidazoles and p-aminophenyl ketones (described in U.S. Pat. No. 3,549,367), acridine or phenazine compounds (described in Japanese Patent Provisional Publication No. 60(1985)-105667 and U.S. Pat. No. 4,239,850) and oxadiazole compounds (described in U.S. Pat. No. 4,212,970).

The amount of the photo polymerization initiator is preferably in the range of 0.01 to 20 wt. %, and more preferably in the range of 0.5,to 5 wt. % based on the solid content of the coating liquid.

The light irradiation for the photo polymerization is preferably conducted by an ultraviolet ray. The exposure energy is preferably in the range of 20 to 50,000 mJ, and more preferably in the range of 100 to 800 mJ. The light irradiation can be conducted with the layer heated to accelerate the photo polymerization reaction.

The optically anisotropic layer has a thickness preferably in the range of 0.1 to 20 $\mu$m, more preferably in the range of 0.5 to 15 $\mu$m, and most preferably in the range of 1 to 10 $\mu$m.

Liquid Crystal Display

The optical compensatory sheet of the invention can be used for liquid crystal displays of various modes. Examples of the display modes include TN (twisted nematic) mode, IPS (in-plane switching) mode, FLC (ferroelectric liquid crystal) mode, OCB (optically compensatory bend) mode, STN (super twisted nematic) mode, VA (vertically aligned) mode, ECB (electrically controlled birefringence) mode and HAN (hybrid aligned nematic) mode. The present invention is particularly suitable for a liquid crystal display of VA mode. When the optical compensatory sheet of the invention is installed in a liquid crystal display of VA mode, the optical biaxial liquid crystal molecules are aligned so that the direction giving the smallest refractive index may be essentially parallel to the normal of the transparent support.

As shown in FIGS. 1 and 2, a liquid crystal display comprises a liquid crystal cell, a polarizing element and an optical compensatory sheet (phase retarder).

The polarizing element generally comprises a polarizing membrane and a protective film.

The polarizing membrane can be classified into an iodine type polarizing membrane, a dichromatic dye type polarizing membrane and a polyene type polarizing membrane. The iodine type polarizing membrane and the dye type polarizing membrane is usually made of a polyvinyl alcohol film. The polarizing axis of the polarizing membrane is perpendicular to the stretching direction of the film.

The protective film is provided on each face of the polarizing membrane, but the transparent support can function as a protective film on one face of the membrane. The protective film on the other face is preferably a cellulose ester film, which has high optical isotropy.

EXAMPLE 1

As a transparent support, triacetylcellulose film in a form of a roll (thickness: 100 $\mu$m) was used. The retardation values in the plane (Re) and along the thickness direction (Rth) were 2 nm and 45 nm, respectively.

A gelatin layer was formed on one surface of the support, and a diacetylcellulose layer was formed on the other surface.

On the gelatin layer, 2 wt. % water/methanol solution of alkyl-modified polyvinyl alcohol (MP-203, Kuraray Co., Ltd.) was applied by means of #12 bar, and dried at 120° C. for 2 minutes to form an orientation layer. The surface of the orientation layer was subjected to rubbing treatment along the longitude of the rolled transparent support.

On the thus-treated orientation layer, 10 wt. % methyl ethyl ketone solution of the following optically biaxial liquid crystal molecules was applied by means of #3 bar, and heated at 135° C. for 5 minutes to align the liquid crystal molecules. Thus, an optically anisotropic layer was formed. The layer was rapidly cooled to prepare an optical compensatory sheet.

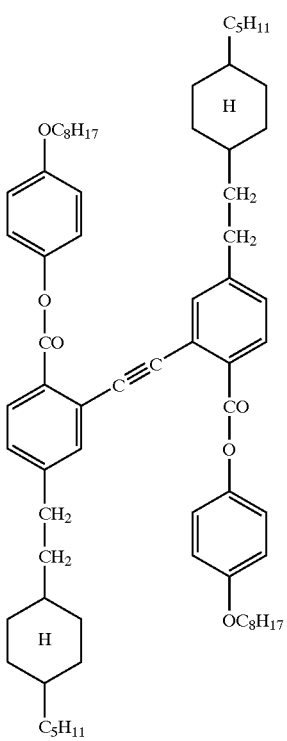

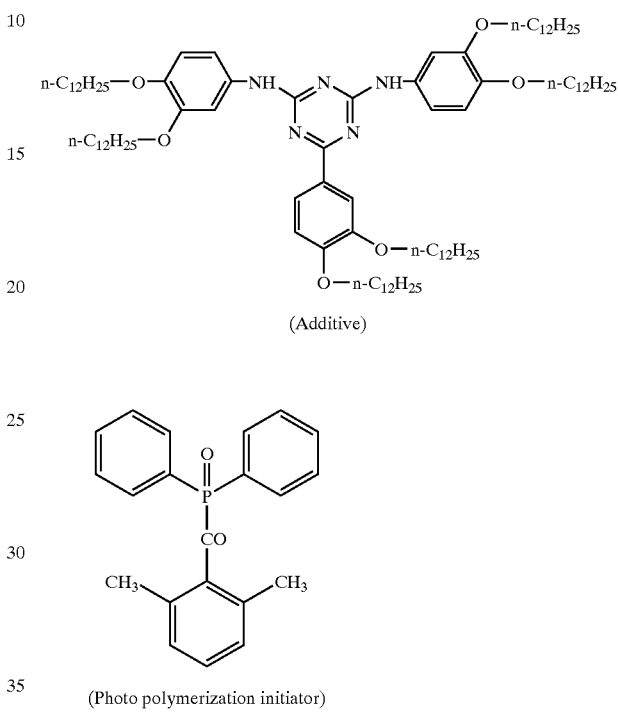

(Additive)

(Photo polymerization initiator)

After another orientation layer was formed and subjected to the rubbing treatment, another optically anisotropic layer was prepared on a glass substrate in the above manner. The refractive indexes (n1, n2 and n3) along the direction perpendicular to the rubbing direction, along the rubbing direction and along the thickness direction were measured by means of an Abbe's refractometer (1T, Atago Co., Ltd.), and found n1=1.66, n2=1.56 and n3=1.46, respectively.

With respect to the prepared optical compensatory sheet, the direction of slow axis and the angle dependency of retardation (based on the slow axis as the axis of rotation) were measured by means of an ellipsometer (M-150, Japan Spectrum Co., Ltd.). Thereby, it was found that the retardation values in the plane (Re) and along the thickness direction (Rth) were 50 nm and 120 nm, respectively. Further, it was also confirmed that the slow axis of the orientation layer was parallel to the rubbing direction and that the slow axis of the optically anisotropic layer was perpendicular to the rubbing direction.

A polyvinyl alcohol film having 80 μm thickness was continuously stretched in iodine aqueous solution to expand into five-fold length, and then dried to prepare a polarizing membrane. With an epoxy adhesive, one surface of the polarizing membrane was laminated on saponified triacetylcellulose film (FUJITAC TD80UF, Fuji Photo Film Co., Ltd.) and the other surface was laminated on the saponified diacetylcellulose surface of the above optical compensatory sheet. The lamination was continuously performed from rolled films, to prepare a polarizing plate. In the polarizing plate, the slow axis of the optically anisotropic Elayer was parallel to the transmitting axis of the polarizing membrane.

EXAMPLE 2

Polyvinyl alcohol (PVA-203, Kuraray Co., Ltd.) was dissolved in a mixed solution of methanol and water (volume ratio: 20/80) to prepare 5 wt. % solution. The solution was applied on a glass plate by means of a bar coater, and dried by air at 80° C. for 10 minutes.

To 1.0 g of discotic liquid crystal molecules (I-2), 10 mg of the following additive and 30 mg of the following photo polymerization initiator were mixed. The mixture was then dissolved in methyl ethyl ketone to prepare 20 wt. % solution, and the solution was applied on the polyvinyl alcohol layer by means of a bar coater.

The naked surface (bottom surface) of the glass substrate was made to be in contact with a heated metal roller (a surface temperature: 130° C.) for 2 minutes, and then further made to be in contact with a slightly heated metal roller (a surface temperature: 30° C.) for 1 minute. The coated surface was exposed to non-polarized ultraviolet light from a 160 W ultraviolet ray irradiating apparatus (UVL-58, ULTRA-VIOLET-PRODUCT) for 10 seconds, to fix the alignment of the discotic liquid crystal molecules.

With respect to the formed layer, the retardation values in the plane (Re) and along the thickness direction (Rth) were measured by means of an ellipsometer (AEP-100, Shimadzu Seisakusho Ltd.). Thereby, it was found that the retardation values in the plane (Re) and along the thickness direction (Rth) were 0 nm and 240 nm, respectively. The thickness of the discotic liquid crystal molecule layer was 2 μm.

The layer was then exposed for 30 minutes at 20° C. to polarized ultraviolet light (wavelength: 290 nm to 310 nm) from a polarized ultraviolet light irradiating apparatus (Nikon Gijutsu Kobo Co., Ltd.) equipped with a transmitting filter and an interference filter. The retardation value in the plane was then measured by means of the ellipsometer to find 20 nm. The refractive indexes along three directions were n1=1.66, n2=1.65 and n3=1.54.

EXAMPLE 3

A glass plate was coated with polyimide (SE-150, Nissan Chemicals, Co., Ltd.), and dried at 210° C. for 60 minutes. The surface was then subjected to rubbing treatment along a certain direction, to form an orientation layer.

3.0 g of rod-like liquid crystal molecules (II-11), 500 mg of a polymerization initiator (Irgacure 369, Ciba-Geigy) and 3 mg of a chiral agent (S811, Merck) were dissolved in 10 ml of N-methylpyrrolidone. The solution was dropped on the orientation layer, and then spin-coated (rotation: 1,000 rpm). After the solvent was evaporated by heating at 100° C. for 30 minutes, the surface was observed by a polarizing microscope to find that the rod-like liquid crystal molecules were oriented in cholesteric alignment.

The surface was then exposed to non-polarized ultraviolet light from a 160 W ultraviolet ray irradiating apparatus (UVL-58, ULTRA-VIOLET-PRODUCT) for 10 seconds, to fix the alignment of the rod-like liquid crystal molecules.

With respect to the formed layer, the retardation values in the plane (Re) and along the thickness direction (Rth) were measured by means of an ellipsometer (AEP-100, Shimadzu Seisakusho Ltd.). Thereby, it was found that the retardation values in the plane (Re) and along the thickness direction (Rth) were 0 nm and 240 nm, respectively. The thickness of the rod-like liquid crystal molecule layer was 2.4 μm.

The layer was then exposed for 30 minutes at 20° C. to polarized ultraviolet light (wavelength: 290 nm to 310 nm) from a polarized ultraviolet light irradiating apparatus (Nikon Gijutsu Kobo Co., Ltd.) equipped with a transmitting filter and an interference filter. The retardation value in the plane was then measured by means of the ellipsometer to find 25 nm. The refractive indexes along three directions were $n1=1.64$, $n2=1.63$ and $n3=1.54$.

We claim:

1. An optical compensatory sheet comprising a transparent support and an optically anisotropic layer formed from liquid crystal molecules, wherein three principal refractive indices of the optically anisotropic layer are different from each other, and wherein the liquid crystal molecules are rod-like liquid crystal molecules oriented in cholesteric alignment.

2. The optical compensatory sheet as defined in claim 1, wherein the rod-like liquid crystal molecule has a polymerizable group, and the optically anisotropic layer is formed by a polymerization reaction of the polymerizable group.

3. The optical compensatory sheet as defined in claim 1, wherein the rod-like liquid crystal molecule has a benzene ring and a double bond conjugated with the benzene ring.

4. The optical compensatory sheet as defined in claim 1, wherein a direction giving the smallest principal refractive index is essentially parallel to a normal of the transparent support.

5. An optical compensatory sheet comprising a transparent support and an optically anisotropic layer formed from liquid crystal molecules, wherein three principal refractive indices of the optically anisotropic layer are different from each other, and wherein the liquid crystal molecules are rod-like liquid crystal molecules represented by the formula (II):

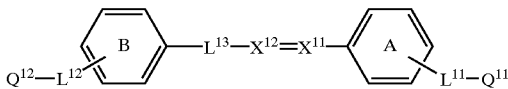

in which $X^{11}$ is $CR^{11}$ or N where $R^{11}$ is hydrogen, a halogen atom, an alkyl group having 1 to 12 carbon atoms or an alkoxy group having 1 to 12 carbon atoms; $X^{12}$ is $CR^{12}$ or N where $R^{12}$ is hydrogen, a halogen atom, an alkyl group having 1 to 12 carbon atoms or an alkoxy group having 1 to 12 carbon atoms; each of $L^{11}$ and $L^{12}$ independently is a single bond or a divalent linking group, selected from the group consisting of —O—, —CO—, —S—, and —NH—, an alkylene group, an alkenylene group, an alkynylene group, an arylene group and a combination thereof; $L^{13}$ is a single bond, —O—CO— or —NH—CO—; each of $Q^{11}$ and $Q^{12}$ is independently a polymerizable group; and each of the benzene rings A and B may have a substituent group selected from the group consisting of a halogen atom, an alkyl group having 1 to 12 carbon atoms, a halogen-substituted alkyl group having 1 to 12 carbon atoms, an alkoxy group having 1 to 12 carbon atoms, an acyl group having 2 to 13 carbon atoms, an alkylamino group having 1 to 12 carbon atoms and an acyloxy group having 2 to 13 carbon atoms.

6. The optical compensatory sheet as defined in claim 5, wherein a direction giving the smallest principal refractive index is essentially parallel to a normal of the transparent support.

7. An optical compensatory sheet comprising a transparent support and an optically anisotropic layer formed from liquid crystal molecules, wherein three principal refractive indices of the optically anisotropic layer are different from each other, and wherein the liquid crystal molecules are rod-like liquid crystal molecules which are aligned at an average inclined angle of less than 5°.

8. The optical compensatory sheet as defined in claim 7, wherein the optically anisotropic layer is formed by exposing the layer to polarized light after the rod-like liquid crystal molecules are oriented in cholesteric alignment at an average inclined angle of less than 5°.

9. The optical compensatory sheet as defined in claim 7, wherein a direction giving the smallest principal refractive index is essentially parallel to a normal of the transparent support.

10. A process for the preparation of an optical compensatory sheet, comprising the steps in order of coating a transparent support with rod-like liquid crystal molecules having a benzene ring and a double bond conjugated with the benzene ring; orienting the rod-like liquid crystal molecules in cholesteric alignment at an average inclined angle of less than 5°; and exposing the layer to polarized light.

11. The process as defined in claim 10, wherein the refractive index in a plane of the optically anisotropic layer essentially changes during the step of exposing the layer to polarized light.

12. The process as defined in claim 10, wherein the polarized light is ultraviolet light within the wavelength range of 200 to 400 nm.

13. The process as defined in claim 10, wherein the rod-like liquid crystal molecules have a polymerizable group, and a step of exposing the rod-like liquid crystal molecules to non-polarized ultraviolet light to polymerize the molecules is conducted between the step of orienting the rod-like liquid crystal molecules in cholesteric alignment at an average inclined angle of less than 5° and the step of exposing the layer to polarized light.

* * * * *